Oct. 30, 1934.  C. H. WHITE ET AL  1,978,874
AGRICULTURAL IMPLEMENT
Filed May 13, 1929   5 Sheets-Sheet 4

Witness
Milton Lenoir

Inventors
Charles H. White
Elmer McCormich
By Brown, Jackson, Boettcher & Dienner
Attorneys.

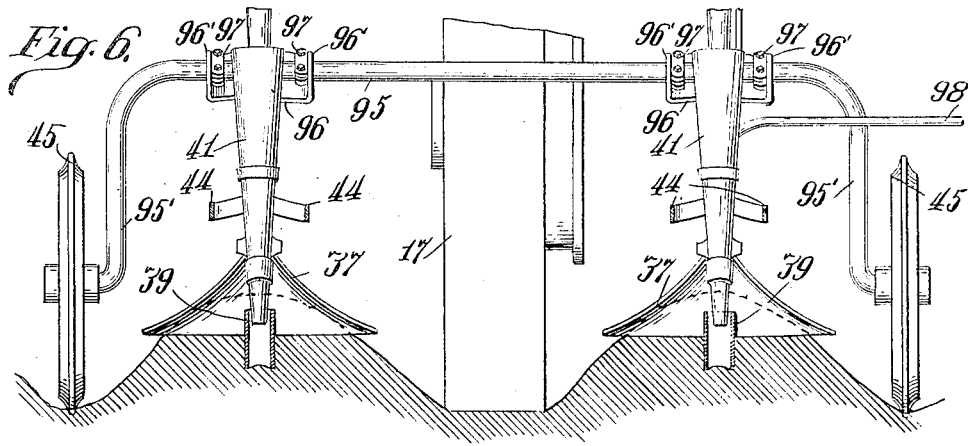
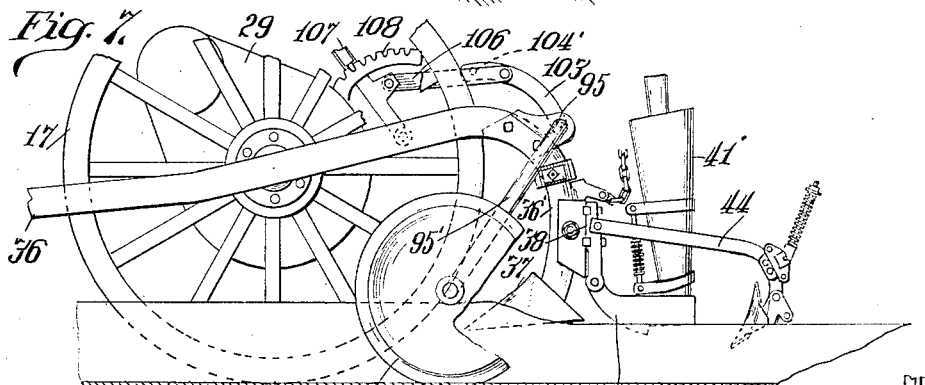
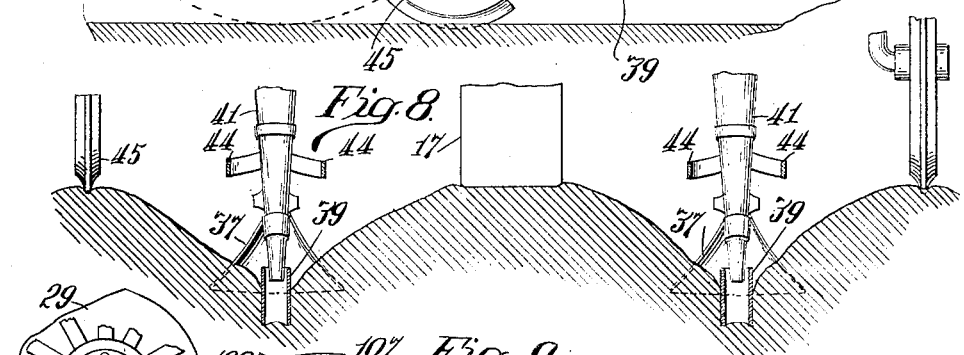
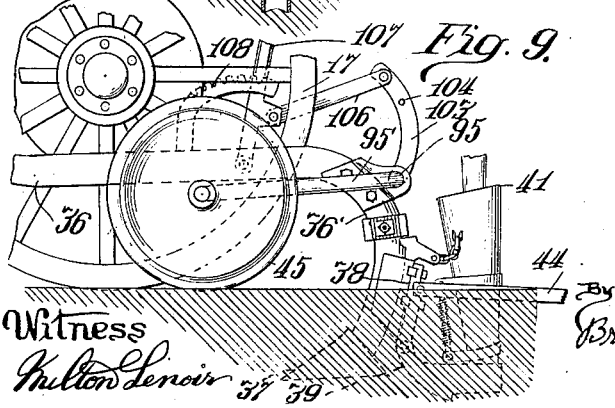

Patented Oct. 30, 1934

1,978,874

UNITED STATES PATENT OFFICE

1,978,874

AGRICULTURAL IMPLEMENT

Charles H. White, Moline, Ill., and Elmer McCormick, Waterloo, Iowa, assignors to Deere & Company, Moline, Ill., a corporation of Illinois Application May 13, 1929, Serial No. 362,486

43 Claims. (Cl. 97—47)

The present invention relates generally to agricultural implements, and in the majority of its improvements has particular reference to an attachment type of implement adapted for readily attachable and detachable connection with a tractor so that when connected together the two function as a unitary, power operated implement.

The embodiment of the invention herein shown has been developed primarily as a planter, particularly for cotton, but, broadly considered, the invention is not limited thereto but includes features which are of more general application adaptable to lister plows or other implements intended to work the soil before or after the planting operation.

Frequently, these heavy draft earth-working operations occur as a part of the operation of planting cotton in listed ground, as where it is desirable for cutting a relatively deep or wide trench in the bottoms of the furrows for receiving the seed, or cutting off the tops of the ridges for receiving the seed therein, or where a listing or middle bursting operation may be performed either before or after planting or harvesting. The present implement in being designed for each of these duties, therefore, embodies features applicable to heavy draft earth-working implements as well as to planting implements.

One of the objects of the invention is to provide such an attachment type of implement carried substantially entirely on the tractor, wherein the beams of the earth-working elements have a novel yieldable hitch connection with the tractor so that if one of the earth-working elements should strike a heavy root, stone or other obstruction, the hitch connection will yield and prevent breakage or damage of the parts.

Another object of the invention is to provide an improved arrangement of adjustable gauge wheels for regulating the operating depth of the earth-working elements and planting means. One of the features of this arrangement is that said gauge wheels are disposed substantially in the transverse plane of the earth-working elements, being spaced laterally therefrom, and are retained approximately in this plane in their wide range of adjustment.

When the earth-working elements are cutting or sweeping the tops of listed ridges the gauge wheels are running in the furrows between the ridges, and when the earth-working elements are operating in the furrows, the gauge wheels are riding on the tops of the listed ridges. This necessarily requires a considerable range of adjustment of the gauge wheels, but in each of these positions, the wheels are approximately in the transverse plane of the earth-working elements. Such location of the wheels is an important factor for maintaining accurate depth adjustment, since if the wheels are disposed considerably fore or aft of the earth working elements they do not encounter rising slopes and depressions at the same time as the earth-working elements and hence do not afford an accurate depth regulation under such conditions. Such location of the gauge wheels also provides a desirable lateral clearance between the same and the rear wheels of the tractor, thereby enabling the earth-working elements to be disposed in close proximity to the transverse plane of said tractor wheels.

In this regard, another object of the invention is to provide an implement of the above general description wherein the earth-working elements are grouped at the rear of the tractor, preferably substantially in the transverse plane of the rear tractor wheels or in close proximity to the position thereof, and the draft pull on such earth-working elements is had from a hitch point located relatively far forward on the tractor with respect to such elements, preferably intermediate the front and rear wheels of the tractor.

Such construction provides a long flexible draft connection, with the line of draft extending substantially to the center of load of the tractor, whereby an easy, steady running of the earth-working elements is obtained. Moreover, said construction locates these elements where they are directly visible to the operator driving the tractor so that he can closely maintain the alignment between the earth-working elements and the planting rows.

Another object is to provide improved means for cross-connecting the main draft beams transversely of the implement adjacent to the rear ends of the beams, in such manner that the beams are free to rise and fall independently but are maintained in proper spacing corresponding to the desired row spacing. This cross-connecting means comprises adjustments whereby the row spacing may be changed as desired.

Further objects of the invention are to provide improved power lift mechanism for raising the earth-working elements and planting devices to transport position; to provide improved manual depth adjusting means for effecting the considerable range of depth adjustment of the gauge wheels; and to otherwise improve upon structures of this general type so that they can be quickly and easily attached to and detached from the tractor, and so that they will be of inexpensive, simple construction.

Referring to the accompanying drawings illustrating one embodiment of our invention:

Figures 6 and 7 are fragmentary rear and side views respectively showing the relation of the gauge wheels to the earth-working elements in the operation of planting in the tops of listed ridges; and Figures 8 and 9 are two similar views showing the relation between the gauge wheels and the earth-working elements in the operation of planting in the bottoms of listed furrows.

Figure 2:
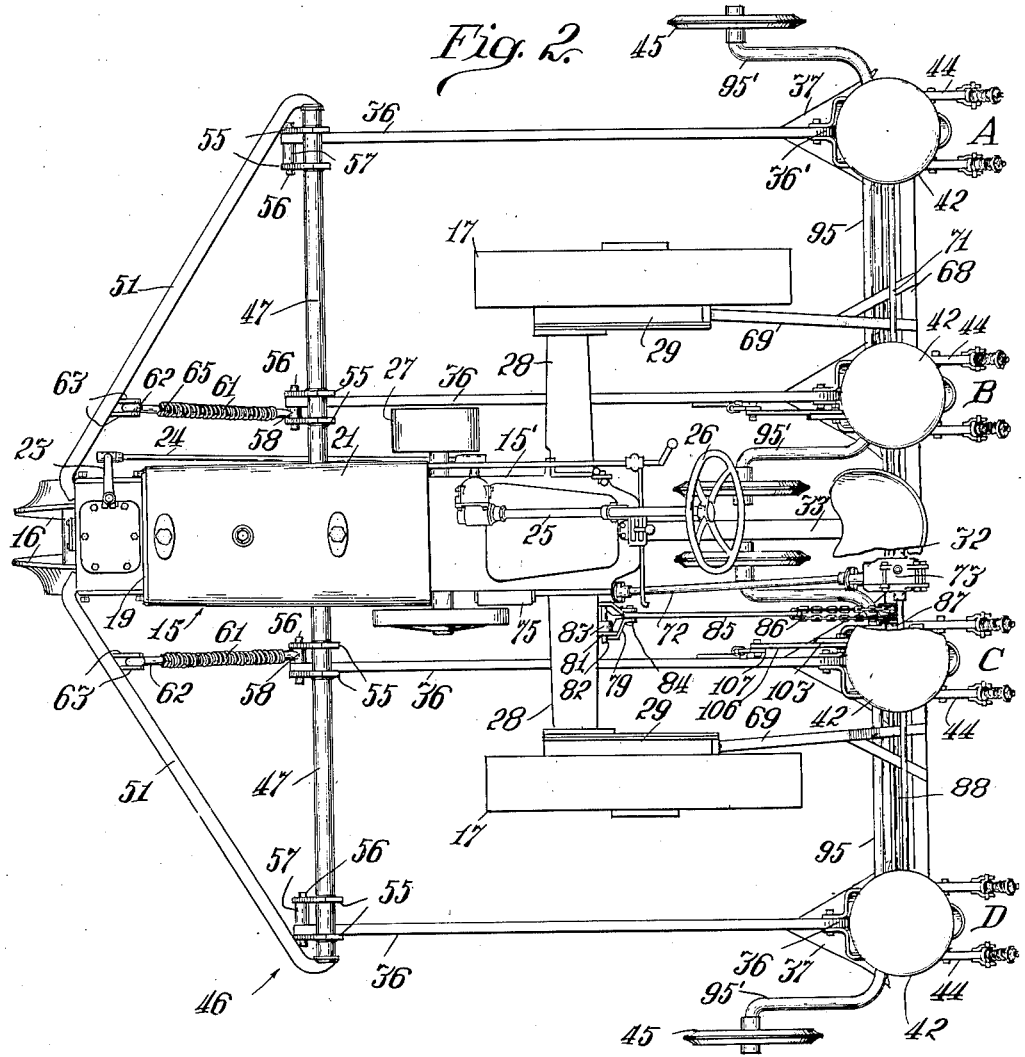
Figure 2 is a plan view of the same.

The tractor comprises a suitable main frame structure 15 which is supported at its front end on two steering wheels 16, 16 and at its rear end on two traction wheels 17, 17. The tractor may be of the three wheel type with a single front steering wheel, such being practically the construction shown, since the two wheels 16, 16 are disposed close together and function virtually as a single wheel; or the tractor may be of the four wheel type wherein the two front wheels are spaced relatively far apart, corresponding, for example, to the spacing of the rear wheels. Such frame structure may be of any appropriate construction, although in the present embodiment we have shown the same as being a part of the housing 15' which encloses the selective speed transmission and differential mechanism of the tractor, and as being formed with a forwardly extending portion 15" forming a bed for the cylinders of the horizontal internal combustion engine 18. In such embodiment, the usual radiator 19 is mounted on the forward portion of the frame, and a fuel tank 21 etxends rearwardly therefrom over the motor 18. As shown in Figure 2, the front steering wheels 16, 16 are preferably disposed close together to track in the space between the adjacent planting rows, and are mounted on a vertically extending standard through which steering movement is transmitted to said wheels by the actuation of steering linkage represented by the arm 23 and drag link 24.

Figure 3:
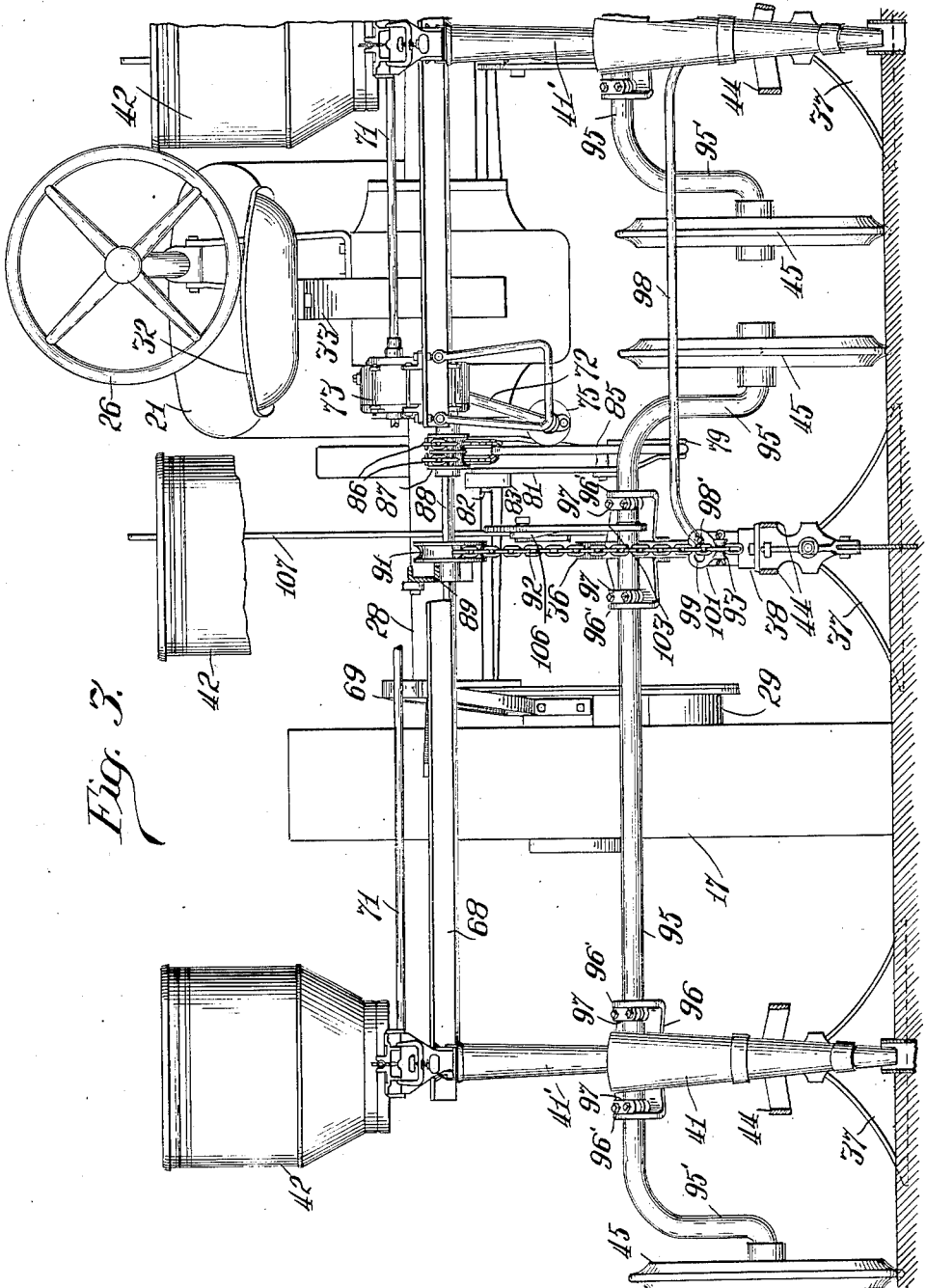
Figure 3 is a fragmentary rear elevational view of the tractor and implement.

The rear end of such drag link has suitable operative connection with a steering shaft 25 supporting the steering wheel 26 in proximity to the operator's position at the rear end of the tractor. Power from the motor 18 is transmitted to a combined clutch and belt pulley indicated at 27 in Figure 2, and thence thru selective speed transmission mechanism and differential gearing, enclosed within the housing 15', to two drive shafts extending outwardly from said housing through tubular housing extensions 28, 28. The outer ends of said extensions are connected with drive chain housings 29 in which the axles 31 of the traction wheels 17 are journaled. It will be noticed that the tubular housing extensions 28 project considerably from the sides of the housing 15' to dispose the traction wheels 17 at a considerable distance from the latter housing, the object being to dispose these two traction wheels on the outer sides of two planting rows whereby the span between the body of the tractor and each traction wheel 17 will span one plant row, and in which space an earth-working or planting rig may be extended. As shown in Figure 3 the housing extensions 28 are disposed at a considerable distance from the ground, thereby providing considerable vertical clearance for the beams of the aforementioned rigs which are disposed between each traction wheel 17 and the body of the tractor.

It will be understood that power is transmitted from the drive shafts in the housing extensions 28 down to the axles 31 of the traction wheels 17 thru drive chains and sprocket wheels, or through gears, are inclosed within the downwardly and rearwardly extending housing portions 29. The operator's seat 32 is mounted on a seat spring 33 extending rearwardly from the main housing 15', the seat being disposed for conveniently observing the path of the earth-working elements relatively to the planting rows.

The implement structure adapted for detachable mounting on the above described tractor is of the four row type comprising four earth-working or planting units A, B, C and D, disposed two on the outer sides of the rear tractor wheels 17, and two between such tractor wheels and the body of the tractor. Each unit comprises a longitudinally extending draft beam 36 having a downwardly curved goose-neck portion 36' at its rear end. The soil working element 37 mounted on the lower end of this goose-neck may be of any desired type or shape, depending upon the conditions of use. When planting in the top of ridges, the device 37 will ordinarily be a sweep; when planting in the bottoms of the furrows, such device will ordinarily be a light middle burster; and when planting in flat ground, either a shallow sweep or any other type of furrow opener may be employed, and in this operation the furrow may be cut relatively deep for establishing a listed condition.

If it is desired to list the ground as an independent operation either before or after planting, the device 37 may be a lister plow bottom or any other soil turning tool for turning up the listed ridges. Also secured to the goose-neck portion of each beam 36 is a suitable bracket or mounting plate 38 on which a seed furrow opener 39 is detachably mounted. Such seed furrow opener may be of the disk or runner type, the latter being shown, and is set to open a seed furrow of the required depth below the level of the cut made by the earth-working element 37. The seed is deposited in said furrow through a boot 41, discharging at the rear of the furrow opener 39 and receiving its seed from the superposed seed hopper 42. The covering of the seed may be effected by shovels or other seed covering devices 43 disposed rearwardly and to the sides of the furrow opener 39, and carried on arms 44 extending back from the mounting bracket 38. The earth-working and planting depths of the members 37 and 39 are determined by gauge wheels 45 which adjustably support the rear portions of the beams 36, as we shall presently describe.

The forward ends of the four beams 36 have pivotal coupling with yieldable hitch or draft transmitting means generally indicated at 46, such point of draft connection being preferably intermediate the positions of the front and rear tractor wheels and in close proximity to the front wheels.

Figure 4:
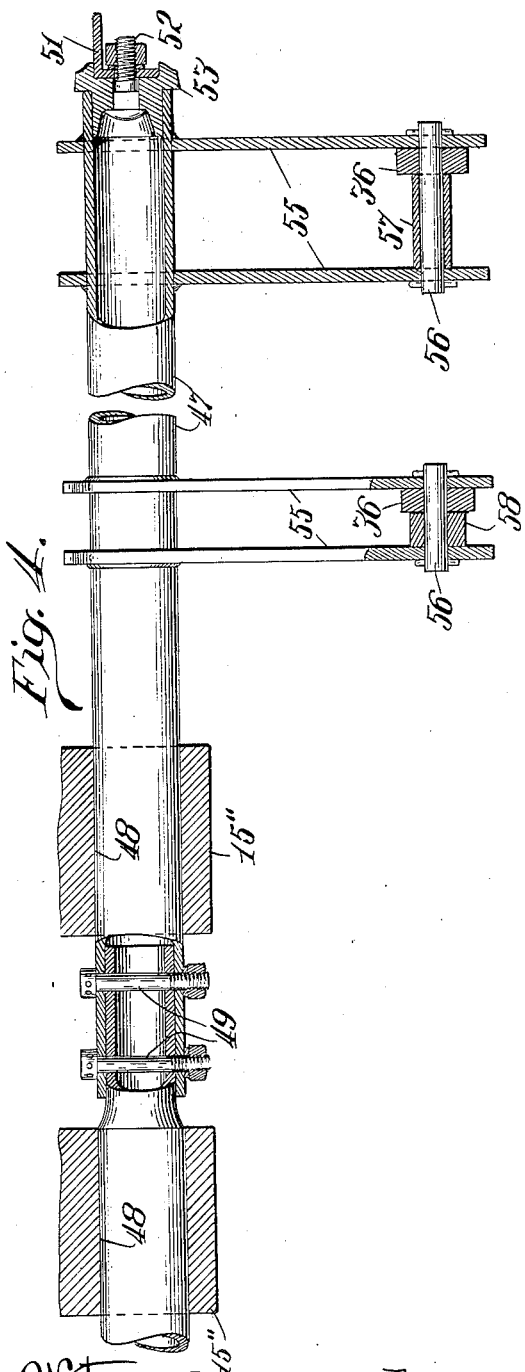
Figure 4 is a fragmentary detail view, partly in vertical section, of the transverse oscillatory draft bar to which the beams are connected.

Referring to Figure 2, such draft means comprises a heavy bar or shaft 47 extending transversely of the tractor and with its ends projecting outwardly therefrom to a sufficient distance to effect coupling with the two outermost beams 36. As shown in Figure 4, said draft bar 47 has rotatable support in laterally spaced bearings 48 formed in the forward portion 15″ of the tractor frame. The bar is preferably composed of heavy pipe stock, and in two sections, with the adjoining ends connected by bolts 49. The outer ends of said draft bar are braced against draft pull by diagonal brace bars 51 which are suitably secured at their inner ends to the front portion of the tractor frame (Figure 2) and are secured at their outer ends by bolts 52 (Figure 4) to plugs 53 secured in the outer ends of the draft bar.

Depending from the draft bar in the longitudinal plane of each draft beam 36 is a pair of spaced arms 55 which are rigidly secured to the rotatable draft bar, as by welding. Extending between the lower ends of each pair of arms is a releasable coupling pin 56 on which the front end of the associated draft beam 36 is pivotally mounted. It will be noted that the two arms 55 of each outermost pair are spaced relatively far apart, and that a spacing sleeve 57 is mounted on each coupling pin thereof for holding the draft beam 36 adjacent to one or the other of the arms.

When the beam 36 is disposed at the outer end of the spacing sleeve 57, as shown in Figure 4, the two outer beams are spaced outwardly for a maximum width of row spacing. To reduce the width of row spacing the coupling pins 56 are withdrawn and the beams 36 are shifted inwardly to be disposed at the inner ends of the spacing sleeves 57. In the case of the two innermost pairs of arms 55, the draft beams 36 are held adjacent to one bar or the other by an apertured link 58 engaging over the coupling pin 56 alongside the beam. By transposing each of such beams to the other sides of the apertured links 58 the two innermost beams can also be moved closer together for a narrower row spacing. It will be understood that the distance through which the two innermost beams will be moved together will always be less than the distance through which the two outermost beams will be moved together because the outermost beams must be displaced through the adjustment of the innermost beams and through their own adjustment as well.

Figure 5:
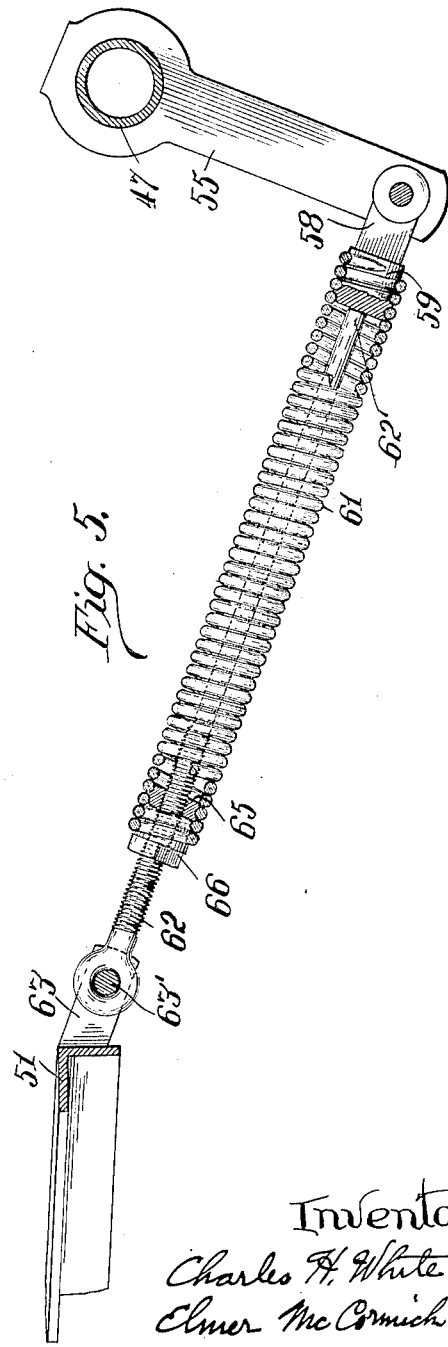
Figure 5 is an enlarged detail view, partly in section, showing one of the springs of the yieldable hitch connection.

Referring to Figure 5, each of the apertured links 58 comprises a helically grooved head 59 over which is screwed the rear end of a heavy tension spring 61. The forward ends of these two springs have connection with the diagonal brace bars 51 on each side of the tractor body through eye bolts 62 which are pivotally mounted in U-shaped brackets 63 secured to said brace bars, being mounted therein on removable pivot bolts 63′.

The forward end of each spring screws over an externally grooved nut 65 which has adjustable threaded mounting on the threaded forward portion of the eye bolt 62. Such nut has a polygonal portion 66 by which the nut may be held with a wrench when turning the screw 62 for adjusting the tension of the spring. The bolt has a shank portion 62′ extending through the length of the spring and normally abutting against the head 59 of the apertured link 58.

It will be seen from the foregoing description of the yielding draft hitch 46 that the pull set up in the four beams 36 establishes a rotative torque in the oscillatory draft bar 47 through the depending arms 55, which torque is opposed by the tension of the two springs 61 acting through the links 58. Certain important advantages accrue to this yielding draft hitch. Both springs are given a relatively heavy initial tension by appropriately adjusting the position of the nuts 65 along the threaded portions of the eye bolts 62. Such initial tensions are constantly maintained by the rear ends 62′ of the eye bolts abutting the heads 59 on the links 58. This permanent tension has the two-fold purpose of preventing needless back and forth working of the ground engaging elements 37 when the same are operating under normal load in ordinary soil conditions, and also of avoiding the necessity of using extremely heavy and expensive springs, since by placing these lighter springs under an initial deflection their aggregate tension can be made equal to the tensile resistance of relatively large springs under no initial deflection.

The springs are so proportioned and tensioned that their aggregate maximum tension is much in excess of the normal drawbar pull of the four beams 36, so much so that these springs can withstand an abnormal draft pull and also absorb the inertia energy of the tractor without breaking. Thus if one of the earth working elements 37 should strike a heavy rooter stone the springs will first yield in absorbing the abnormal draft pull and if the increased draft transmitted from the springs thus extended does not overcome the obstacle, the continued elongation of the springs will absorb the momentum energy of the tractor and bring the same to a dead stall, killing the motor. Thus the possibility of breakage under bad soil conditions is greatly reduced. Moreover, the spring cushioning of this hitch connection permits operation in hard soil or stony or rooty ground and insures uniform efficient planting even under these conditions, because the yield of the hitch allows the momentum of the tractor to continue and thereby avoids a jerky operation. If the springs should be pulled out beyond their limit of elasticity and take a permanent set, this can be overcome by readjustment of the nuts 65 along the threaded eye bolts 62. If under some extreme condition, as when operating downhill under which condition the momentum of the tractor may become extremely large, the springs 61 should be unable to absorb the momentum of the tractor, these springs will be the point of failure in the line of parts.

It is preferable to have these springs fail, rather than some other part of greater expense and more difficult to replace. In this regard the use of tension springs is preferable to compression springs because the latter will often go solid and not break.

The four seed hoppers 42 are mounted on a suitable attachment frame comprising one or more transversely extending angle bars 68. Said frame is detachably secured to the tractor by mounting brackets or arms comprising pairs of substantially parallel spaced bars 69 (Figure 1) extending downwardly and forwardly from said frame and having ready attachment to an upright bolting surface at the rear end of each chain drive housing 29. The hoppers discharge through tubes 41′ down into the boots 41, and the hoppers may be arranged for transverse shifting on the frame 68 to correspond with different row spacings. A seed feeding shaft 71 extends transversely of the frame 68 and is operatively connected to drive the usual seed feeding plates in the bottoms of the hoppers 42. Such feeding mechanism is preferably driven by take-off power from the tractor through a shaft 72 (Figure 1) which is operatively connected to drive the seeding shaft 71 through gear mechanism enclosed within a housing 73.

The forward end of the shaft 72 has suitable coupling with a power take-off shaft 74 extending from a power take-off housing 75 on the side of the tractor frame. The take-off shaft 74 is arranged to be driven from the motive power of the engine 18 through suitable driving connections within the frame housing of the tractor. A power lift for all of the earth-working and planting rigs is also obtained from the power take-off mechanism 75. A crank arm 76 extends from the side of said mechanism and is arranged to be driven through half revolutions through the instrumentality of a half revolution clutch embodied within said mechanism and capable of being tripped by the operator from his position on the tractor seat 32. Pivotally connected with said crank arm and extending rearwardly therefrom is a rod 77 which is pivotally connected at 78 to a plate 79 rigidly secured to the lower end of a swinging arm 81. The upper end of said arm is pivotally connected at 82 to a bracket 83 projecting from one of the tubular housing extensions 28. Pivotally connected at 84 to the plate 79 is a link 85 which is connected at its rear end with the loop of a chain 86. As shown in Figure 3 the two ends of said chain extend around a double sheave 87 and are secured thereto. Said sheave is mounted on a transversely extending lifting shaft 88 having bearing support in brackets 89 carried by the attachment frame 68. In the longitudinal plane of each planting unit a sheave 91 is mounted on the lifting shaft, and connected with each of these latter sheaves and windable thereon is a flexible lifting member 92, preferably in the form of a chain. The lower end of each chain 92 is connected with a bracket 93 extending from the goose-neck portion of its individual beam 36.

With the planting units down in their operating position, each of these lifting chains 92 has sufficient slack therein to permit the desired range of depth adjustment of the unit without interference from the power lift mechanism. To lift all of the beams to transport position the operator trips the half revolution clutch in the power take-off mechanism 75, which causes the crank 76 to swing to a position diametrically opposite from that shown in Figure 1. This operates thru link 77, lever 81, link 85 and chain 86 to revolve the lifting shaft 88. The consequent rotation of each of the sheaves 91 mounted on said shaft raises all of the beams to transport position through the lifting chains 92. To lower all of the beams to operative position, it is only necessary to again trip the half revolution clutch, thereby causing the crank 76 to revolve back to its former position and allowing the beams to swing downwardly by gravity.

Referring now to the depth adjusting gauge mechanism, it will be seen from Figure 3 that the gauge wheels 45 are mounted on the downwardly turned ends 95' of crank axles 95. There is one of these crank axles at each side of the implement, spanning and supporting two planter units. Bolted to the opposite sides of the rear portion of each beam 36 is a pair of bracket plates 96 having outwardly and upwardly bent portions forming two widely spaced bearings 96' in which the crank axle 95 is journaled.

Two releasable clamp collars 97, 97 are secured to the crank axle to bear against the inner sides of each pair of bearings 96' for preventing relative lateral shifting between the beam and the crank axle. By virtue of this mounting of two rig beams on one crank axle, it will be evident that the intervening portion of the crank axle functions as a cross-connecting or tying means between the two beams for maintaining the latter in proper spaced relation. The two pairs of rigs at opposite sides of the implement are also cross-connected at the center of the implement by a transverse rod 98. The ends 98' of said rod have pivotal mounting in holes 99 provided in brackets 101 secured to the beams of the two innermost units B and C. Such rod maintains the desired row spacing between the right and left-hand pairs of rigs. The pivotal connections 98', 99 at the ends of said rod provide the desired flexibility for permitting the rigs at one side to rise and fall independently of the rigs at the other side, in the travel of the implement over uneven ground. Each rig is also free to rise and fall as its associated gauge wheel passes over uneven ground, independently of rising and falling movement of its companion rig on that side of the implement. In such vertical movement of one rig, the tilting of its companion rig through the transverse portion of the crank axle 95 will be practically negligible owing to the considerable spacing between the rigs.

Hence it will be seen that the cross-connections between the rear ends of the four rigs provide the desired flexibility for permitting the rigs to rise and fall in operation independently of each other.

When the front ends of the beams are moved inwardly for a narrower row spacing, as described in connection with Figure 4, the clamp collars 97 of the outer beams, or of both pairs of beams, are released and the rear ends of the beams are appropriately shifted on each crank axle 95 to bear the same spaced relation as the front ends of the beams. Each bracket 101 is provided with at least two holes 99 and in effecting this narrower adjustment the pivot ends 98' of the cross link 98 are shifted to the outermost holes 99 for disposing the rear ends of the two inner rigs in the desired closer spacing.

By mounting each right and left hand pair of beams on a single crank axle 95 and carrying both beams by a single pair of gauge wheels 45 disposed on the outer or opposite sides of the pair of beams, there is avoided the necessity of gauge wheels intermediate such pair of beams and consequently this space can be occupied by one of the rear tractor wheels 17 without the possibility of interference between such tractor wheels and the gauge wheels.

Figure 1:
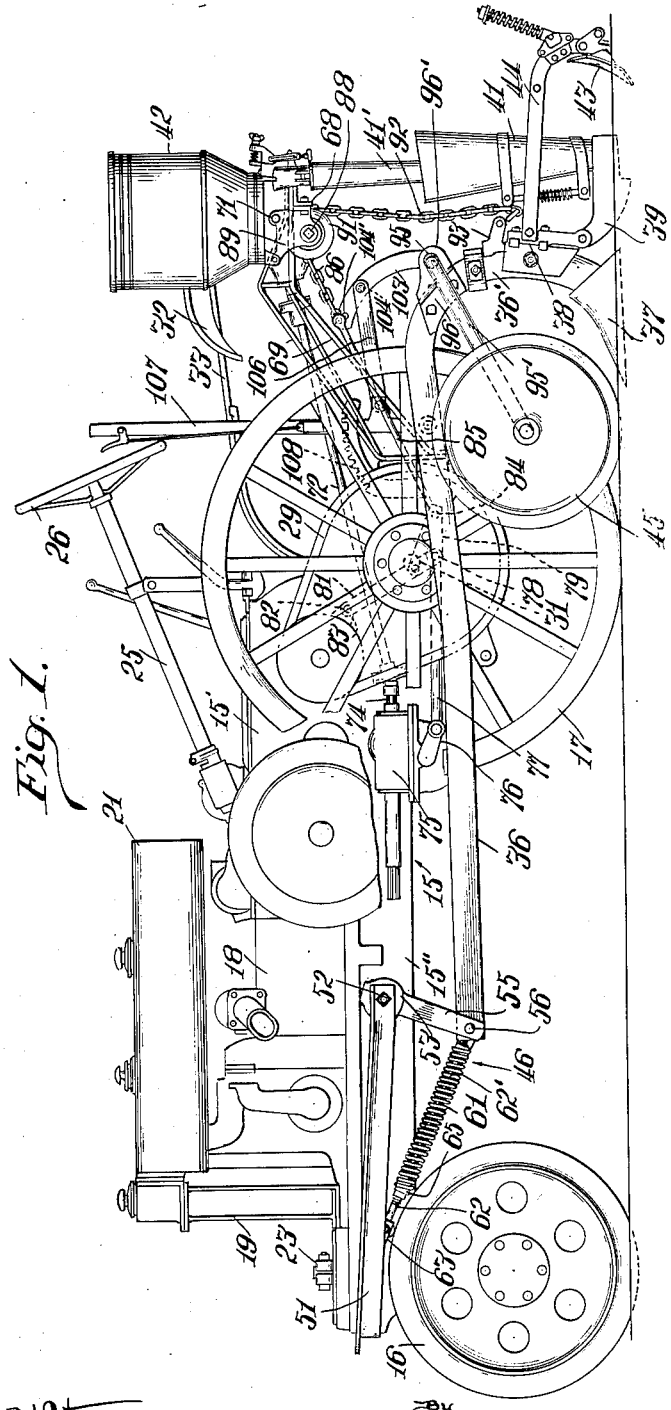
Figure 1 is a side view of the tractor and implement attachment in assembled relation, the earth-working elements and planting means being illustrated in the position corresponding to flat land planting.

Referring to Figure 1, such relation enables the gauge wheels to be disposed substantially in the transverse plane of the rear tractor wheels; at the same time, it permits each gauge wheel 45 and its associated earth-working element 37 to be grouped close together with the earth-working element disposed in the transverse plane of the rear tractor wheels or in immediate proximity to the position of such wheels.

The actuating mechanism for effecting depth adjustments comprises an arm 103 extending upwardly from each crank axle 95 and having two spaced holes 104 and 104' in its upper end. Pivotally connected with either of these holes is a link 106 extending forwardly and pivotally connected to a manually operated depth adjusting lever 107. It will be understood that the two crank axles 95 each have an individual depth adjusting lever 107 operatively connected therewith as above described, these two levers 107 being disposed on opposite sides of the operator's seat 32 and conveniently accessible therefrom. Each lever swings over a latching sector 108 and is provided with the usual dog adapted to engage in the teeth of said sector for holding the lever and crank axle in any desired setting of depth adjustment.

Figures 1 and 3 illustrate the adjusted relation between the gauge wheels 45 and the earth-working elements 37 when planting in flat ground.

It will be noted that the gauge wheels are in substantially the same transverse plane as the points of the earth-working elements so that in the travel of the gauge wheels up and down over sharp rises and depressions, the depth of penetration of the earth-working elements will remain substantially constant in such uneven ground. Figures 6 and 7 illustrate the relation between the gauge wheels and the earth-working elements when planting in the tops of listed ridges. At this time the gauge wheels travel in the furrows between the ridges with the earth-working elements cutting off the tops of the ridges or forming furrows therein, depending upon the type of tool employed. It will also be noted that in this relation, the gauge wheels are substantially in the transverse plane of the earth-working devices. Figures 8 and 9 illustrate this relation when planting in the bottoms of the furrows of listed soil. At this time the wheels are riding on the tops of the ridges, with the earth-working elements cutting a trench or sweeping back the sides of the furrow. Likewise, in this relation the gauge wheels remain approximately in the same transverse plane as the earth-working elements. Hence, in all of the planting or listing conditions in which the implement may be used the gauge wheels maintain an accurate depth of penetration of the earth-working elements as the implement passes over uneven ground.

When planting in the tops of the ridges the links 106 extending from the adjusting levers 107 are pivotally connected to the lowermost holes 104 of the arms 103 so that the entire range of adjustment of the levers 107 will remain effective with the gauge wheels in their relatively low positions. Conversely, when planting in the bottoms of the furrows the links 106 are connected to the upper holes 104' so that the range of adjustment of the levers 107 will remain effective with the wheels in their relatively high position. Said links may be connected with either the upper or lower holes when planting in flat ground.

As before remarked, the spacing of the gauge wheels outwardly to the sides of the earth-working elements enables these wheels to be located substantially in the transverse plane of said elements without interfering therewith or being engaged by trash which may be pushed ahead of the earth-working elements; and, in addition, such lateral spacing enables the earth-working elements to be disposed approximately in the transverse plane of the rear tractor wheels 17 or in immediate proximity to the position of said wheels. This latter feature is also of decided advantage because it disposes the earth-working elements where they can be readily observed by the operator from his position on the tractor seat 32, and also shortens the length of the entire machine so that the planting can be carried up closer to the head land at the end of the field.

While the present implement has been devised primarily as a cotton planter, it will be understood that it may be employed for planting other crops, and it will also be evident from the foregoing that it may be employed for listing the land either before or after planting, or for performing other earth-working operations aside from planting. When it is desired to dismount the implement from the tractor it is only necessary to release the brace bars 51, remove the draft bar 47, and take off the rear attachment frame 63. The depth adjusting levers 107 and latching sectors 108 are mounted on the two intermediate beams 36 so that they are dismounted as a unit with the beams.

While we have disclosed what we regard as the preferred embodiment of our invention, it will be understood that such is merely exemplary and that numerous modifications and re-arrangements may be made therein without departing from the essence of the invention.

We claim:

1. The combination with a tractor including front and rear wheels, of an implement attachment comprising a plurality of beams extending substantially longitudinally of the tractor and vertically movable independently of each other, earth-working devices on said beams disposed adjacent to the position of said rear tractor wheels, yielding hitch means connecting the front portions of said beams with said tractor forward of the position of said rear wheels, and gauge wheels connected with the rear portions of said beams.

2. The combination with a tractor including front and rear wheels, of an implement attachment comprising a plurality of beams extending substantially longitudinally of the tractor and disposed intermediate said rear traction wheels and on the outer sides thereof, earth-working devices on said beams adjacent to the position of said rear tractor wheels, planting means associated with each of said beams, yielding hitch means connecting the front portions of said beams with said tractor forward of the position of said rear wheels, and gauge wheels connected with the rear portions of said beams.

3. The combination with a tractor including front and rear wheels, of an implement attachment comprising a plurality of beams extending substantially longitudinally of the tractor and movable vertically independently of each other, earth-working devices on said beams disposed adjacent to the position of said rear tractor wheels, yielding hitch means connecting the front portions of said beams with said tractor forward of the position of said rear wheels, gauge wheels connected with the rear portions of said beams, and means flexibly connecting the rear portions of the beams together transversely of the tractor.

4. The combination with a tractor including front and rear wheels, of an implement attachment comprising a plurality of beams extending substantially longitudinally of the tractor and disposed intermediate said rear traction wheels and on the outer sides thereof, earth-working devices on said beams disposed adjacent to the position of said rear tractor wheels, planting means associated with each of said beams, yielding hitch means connecting the front portions of said beams with said tractor forward of the position of said rear wheels, gauge wheels connected with the rear portions of said beams, and a transverse link pivotally connected with the rear portions of the two intermediate beams for maintaining said beams all in proper spaced relation.

5. The combination with a tractor including front and rear wheels, of an implement attachment comprising a plurality of beams extending substantially longitudinally of the tractor, earth-working devices on said beams disposed adjacent to the position of said rear tractor wheels, and yieldable hitch mechanism connecting the front portions of said beams with the forward portion of the tractor, said hitch mechanism comprising spring means arranged to transmit a yieldable draft to said earth-working elements and to absorb the inertia energy of the tractor for stopping the same in the event of excessive draft load.

6. The combination with a tractor including front and rear wheels, of an implement attachment comprising a plurality of beams extending substantially longitudinally of the tractor, and disposed intermediate said rear tractor wheels and on the outer sides thereof, earth-working devices on said beams disposed adjacent to the position of said rear tractor wheels, and yieldable hitch mechanism connecting the front portions of said beams with the forward portion of the tractor, said hitch mechanism comprising a tension spring constantly maintained under an initial deflection and arranged to transmit a yieldable draft force to said earth-working elements.

7. The combination with a tractor including front and rear wheels, of an implement attachment comprising a plurality of beams extending substantially longitudinally of the tractor, earth-working devices on said beams disposed adjacent to the position of the rear tractor wheels, transverse draft bar means movably supported on the tractor forward of said rear wheels, each of said beams being connected with said draft bar means whereby the draft forces of said beams tend to move said draft bar means relatively to the tractor, and spring means connected to oppose such movement of said draft bar means.

8. The combination with a tractor including front and rear wheels, of an implement attachment comprising a plurality of beams extending substantially longitudinally of the tractor, earth-working devices on said beams disposed adjacent to the position of said rear tractor wheels, a transverse draft bar having oscillatory mounting on the tractor forward of said rear wheels, each of said beams being connected with said bar to establish a rotative torque therein substantially in proportion to the draft on said beam, and spring means connected to oppose said rotative torque in the draft bar.

9. The combination with a tractor including front and rear wheels, of an implement attachment comprising a plurality of beams connected with the tractor and disposed in a generally longitudinal position intermediate said rear traction wheels and on the outer sides thereof, means pivotally connecting the front portions of said beams with said tractor at hitch points disposed forwardly of said rear tractor wheels, earth-working devices on said beams disposed adjacent to the position of said rear wheels, gauge wheels for said beams spaced laterally from said earth-working devices and operating substantially in the transverse plane of said devices, and adjusting means movably connecting said gauge wheels with said beams.

10. The combination with a tractor including front and rear wheels, of an implement attachment comprising a plurality of beams disposed intermediate said rear tractor wheels and on the outer sides thereof, means pivotally connecting the front portions of said beams with said tractor at hitch points disposed forwardly of said rear tractor wheels, earth working devices on the rear portions of said beams, two crank axles having pivotal connection with the rear portions of said beams, each of said crank axles having its intermediate portion extending from one of the intermediate beams to the companion outer beam and having crank axle ends disposed on the inner and outer sides of said intermediate and outer beams, and gauge wheels mounted on said crank axle ends.

11. The combination with a tractor including front and rear wheels, of an implement attachment comprising two intermediate beams extending longitudinally of the tractor intermediate the rear tractor wheels and two outer beams extending longitudinally of the tractor on the outer sides of said rear tractor wheels, yieldable hitch mechanism connecting the front portions of said beams with the forward portion of the tractor, said hitch mechanism comprising spring means arranged to transmit a yieldable draft to said beams and to absorb the inertia energy of the tractor for stopping the same in the event of excessive draft load, earth-working devices on said beams disposed adjacent to the position of said rear tractor wheels, two crank axles having pivotal connections with the rear portions of said beams, each of said axles having its intermediate portion extending from one of said intermediate beams to the adjacent outer beam and having downwardly extending crank axle ends spaced inwardly and outwardly respectively from said intermediate and outer beams, gauge wheels mounted on said crank axle ends and operating substantially in the transverse plane of said earth-working elements and in proximity to the position of said rear tractor wheels, separate adjusting devices operatively connected with said crank axles, and means pivotally connected with said beams to maintain a substantially constant spacing between the rear portions of the two intermediate beams.

12. The combination with a tractor including front and rear wheels, of an implement attachment comprising a plurality of beams extending substantially longitudinally of the tractor, earth-working devices on said beams adjacent to the position of said rear wheels, a transverse draft bar supported on the tractor forward of the position of said rear wheels, hitch means connecting the forward portions of said beams with said draft bar, said hitch means permitting transverse shifting of the front portions of said beams relatively to said draft bar for a greater or lesser spacing between the front portions of said beams, means cross-connecting the rear portions of said beams, said latter means permitting transverse shifting of said rear portions relatively to each other, and gauge means associated with the inside beams and disposed in ground engaging position adjacent one another and adjacent the central vertical longitudinal plane of the tractor.

13. The combination with a tractor comprising a frame, front steering and rear traction wheels supporting said frame, a motor mounted on said frame and operatively connected with said rear traction wheels to propel the tractor, and a power take-off device on the tractor adapted to be driven by said motor, of an implement attachment comprising a plurality of beams extending substantially longitudinally of the tractor and disposed intermediate said rear traction wheels and on the outer sides thereof, means pivotally connecting the front portions of said beams with said tractor at hitch points disposed forwardly of said rear traction wheels, earth-working devices mounted on the rear portions of said beams in rear of said rear traction wheels, an attachment frame adapted for detachable mounting on the rear portion of the tractor frame, rotatable lifting shaft means supported on said attachment frame, flexible lifting members operatively connected with said shaft means and connected with the rear portions of said beams for lifting the same to transport position, and power lift means operatively connecting said power take-off device with said lifting shaft means for rotating the latter.

14. In an agricultural implement, the combination of a wheel supported frame, a plurality of laterally spaced beams extending substantially longitudinally of said frame, earth-working elements mounted on the rear portion of said beams, a transverse draft bar mounted on the forward portion of said frame for axial oscillatory movement, arms extending from said bar, the forward portions of said beams being pivotally connected with said arms whereby the draft load of said beams is transmitted to said draft bar as a rotative torque created therein, a tension spring operatively connected with said draft bar whereby the contractile tension of said spring opposes the draft load torque established in said draft bar, and means cooperating with said spring for constantly maintaining the same under an initial tension independently of any draft load on said beams.

15. The combination with a tractor including front and rear wheels, of an implement attachment comprising a plurality of beams extending substantially longitudinally of the tractor and vertically movable independently of each other, earth-working devices on said beams disposed adjacent to the position of said rear tractor wheels, means connecting the front portions of said beams with said tractor forward of the position of said rear wheels, gauge wheels connected with the rear portions of said beams and spaced laterally therefrom, and means for maintaining the beams in fixed lateral relationship.

16. The combination with a tractor including front and rear wheels, of an implement attachment comprising a plurality of beams extending substantially longitudinally of the tractor, means pivotally connecting the front portions of said beams with said tractor at hitch points disposed forwardly of the rear tractor wheels, earth-working devices on said beams disposed adjacent to the position of said rear tractor wheels, crank axles mounted on the rear portions of said beams, gauge wheels mounted on said crank axles in laterally spaced relation to said earth-working devices but in close proximity to the transverse plane of said devices, and means connecting said crank axles to hold the same in fixed lateral relation with respect to each other while permitting independent vertical movement thereof.

17. The combination with a tractor including front and rear wheels, of an implement attachment comprising a plurality of beams extending substantially longitudinally of the tractor and disposed intermediate said rear tractor wheels and on the outer sides thereof, means pivotally connecting the front portions of said beams with said tractor at hitch points disposed forwardly of said rear tractor wheels, earth-working devices on the rear portions of said beams, two crank axles having pivotal connection with the rear portions of said beams, each of said crank axles having its intermediate portion extending from one of the intermediate beams to the companion outer beam and having crank axle ends disposed on the inner and outer sides of said intermediate and outer beams, gauge wheels mounted on said crank axle ends, and means connecting the two crank axles to hold said crank axles in fixed lateral relation with respect to each other meanwhile permitting independent vertical movement thereof.

18. The combination with a tractor including front and rear wheels, of an implement attachment comprising a plurality of vertically movable beams extending substantially the entire length of the tractor, means connecting the front portions of said beams with said tractor forward of the position of said rear wheels and near the front wheels, plow elements carried by said beams substantially in the transverse plane of the rear portions of said rear wheels for listing the ground or for working listed ridges or furrows, crank axles connected with said beams and gauge wheels carried by said axles and disposed laterally outwardly of said plow elements and intermediate the transverse plane thereof and the axis of said rear wheels.

19. The combination with a tractor having a power lift and front and rear wheels and drive housings therefor, of a supporting frame extending transversely at the rear of the tractor back of the rear wheels, a pair of supports extending rearwardly and upwardly from said housings to receive said supporting frame, lifting shaft means extending transversely of the tractor and journaled on the frame and extending beyond the two sides of the tractor, operative connections from the power lift on the tractor for operating said lifting shaft means at least one tool beam extending generally longitudinally of the tractor and connected therewith at its forward end and forwardly of said drive housings, and connections between the lifting shaft means and said beam whereby operation of said power lift reacts against said supports to raise said beam.

20. The combination with a tractor having a frame and spaced drive wheels, of a pair of laterally spaced tool beams extending longitudinally of the tractor and pivoted to the tractor frame, a crank axle journaled on each beam and having at the crank end a gauge wheel and a lifting arm near the other end, and manually operable adjusting mechanism pivoted on each of the tool beams and connected with each arm to swing each crank axle independently of the other crank axle.

21. The combination with a tractor having a frame, front wheels, spaced drive wheels and drive housings therefor, of a seeder attachment comprising a tool beam extending longitudinally of the tractor and pivoted to the tractor frame, a crank axle journaled on the beam and having at one end a gauge wheel, brackets carried by said drive housings, a seeder frame supported by the brackets above the crank axle, lifting means carried by said frame and brackets and operable to raise said beam, and manually operable adjusting means connected with the other end of said crank axle and spaced in a fore and aft direction with respect to said lifting means.

22. The combination with a tractor including front and rear wheels, of an implement attachment comprising a plurality of beams movable vertically independently of each other, earth-working devices on said beams disposed adjacent to the position of said rear tractor wheels, hitch means connecting the front portions of said beams with said tractor forward of the position of said rear wheels, gauge wheels connected with the rear portions of said beams, and means disposed substantially in the plane of said beams for flexibly connecting the rear portions thereof together transversely of the tractor.

23. The combination with a tractor including front and rear wheels, of an implement attachment comprising a plurality of beams disposed intermediate said rear traction wheels and on the outer sides thereof, earth-working devices on said beams disposed adjacent to the position of said rear tractor wheels, hitch means connecting the front portions of said beams with said tractor forward of the position of said rear wheels, gauge wheels connected with the rear portions of said beams, and means pivotally connected with the rear portions of the two intermediate beams for maintaining said beams in proper spaced relation.

24. The combination with a tractor including front and rear wheels, of an implement attachment comprising a plurality of beams extending substantially longitudinally of the tractor, earth-working devices on said beams disposed adjacent to the position of the rear tractor wheels, shiftable draft means movably supported on the tractor forward of said rear wheels, each of said beams being connected with said draft means whereby the draft force of said beams tends to move said means relatively to the tractor, and spring means connected to oppose such movement of said draft means.

25. The combination with a tractor including front and rear wheels, of an implement attachment comprising a plurality of beams, means pivotally connecting the front portions of said beams with said tractor at hitch points disposed forwardly of said rear tractor wheels, earth-working devices on the rear portions of said beams, two crank axles having pivotal connection with the rear portions of said beams at laterally spaced points thereon, and gauge wheels mounted on said crank axle ends.

26. The combination with a tractor including front and rear wheels, of an implement attachment comprising a plurality of beams, means pivotally connecting the front portions of said beams with said tractor at hitch points disposed forwardly of said rear tractor wheels, earth-working devices on the rear portions of said beams, two crank axles having pivotal connection with the rear portions of the beams and forwardly extending crank ends disposed adjacent the rear wheels of the tractor, and gauge wheels mounted on said crank axle ends.

27. The combination with a tractor including front and rear wheels, of an implement attachment comprising a plurality of beams, means pivotally connecting the front portions of said beams with said tractor at hitch points disposed forwardly of said rear tractor wheels, earth working devices on the rear portions of said beams, two U-shaped crank axles having their intermediate portions extending transversely with respect to said beams and pivotally connected therewith and their crank ends extending forwardly adjacent the rear wheels of the tractor and said earth-working devices, and gauge wheels mounted on said crank axle ends.

28. The combination with a tractor comprising a frame, front steering and rear traction wheels supporting said frame, a motor mounted on said frame and operatively connected with said rear traction wheels to propel the tractor, and a power take-off device on the tractor adapted to be driven by said motor, of an implement attachment comprising a plurality of beams disposed intermediate said rear traction wheels and on the outer sides thereof, means pivotally connecting the front portions of said beams with said tractor at hitch points disposed forwardly of said rear traction wheels, earth-working devices mounted on the rear portions of said beams, an attachment frame adapted for detachable mounting on the rear portion of the tractor frame, rotatable lifting shaft means supported on said attachment frame, means operated by said lifting shaft means and connected with the rear portions of said beams for lifting the same to transport position, and power lift means operatively connecting said power take-off device with said lifting shaft means for rotating the latter.

29. The combination with a tractor comprising a frame, front steering and rear traction wheels supporting said frame, a motor mounted on said frame and operatively connected with said rear traction wheels to propel the tractor, and a power take-off device on the tractor adapted to be driven by said motor, of an implement attachment comprising a plurality of beams disposed intermediate said rear traction wheels and on the outer sides thereof, means pivotally connecting the front portions of said beams with said tractor at hitch points disposed forwardly of said rear traction wheels, earth-working devices mounted on the rear portions of said beams, a pair of rearwardly extending bracket members removably carried on the rear portion of the tractor frame, lifting rock shaft means journaled in said members, link means interconnected with said lifting rock shaft means and said beams for lifting the same to transport position, and power lift means operatively connecting said power take-off device with said lifting shaft means for rotating the latter.

30. The combination with a tractor including front and rear wheels, of an implement attachment comprising a plurality of vertically movable beams extending substantially the length of the tractor, means connecting the front portions of said beams with said tractor forward of the position of said rear wheels and near the front wheels, soil tilling tools carried by said beams and disposed adjacent the position of the rear wheels of the tractor, crank axles connected with said beams at laterally spaced points thereon, said axles having crank portions disposed outside the longitudinal planes of said rear wheels and said tools and extending in a generally fore and aft direction relative to the tractor, and gauge wheels mounted on said crank portions and disposed in a transverse plane lying between said tools and the axis of said rear wheels.

31. The combination with a tractor including front and rear wheels, of an implement attachment comprising a plurality of tool beams arranged in pairs at opposite sides of the tractor, the beams comprising each pair being disposed on opposite sides of the rear wheels of the tractor, earth-working tools on said beams, hitch means connecting the front portions of said beams with said tractor forward of the position of said rear wheels, means connecting the beams of each pair together, means connecting said pairs of beams, and a ground engaging gauge means associated with each pair of beams.

32. The combination with a tractor including front and rear wheels, of an implement attachment comprising a plurality of pairs of beams, earth-working tools on said beams adjacent to the position of said rear wheels, hitch means connecting the front portions of said beams with said tractor forward of the position of the rear wheels thereof, the beams of each pair being disposed on opposite sides of the rear wheels, means interconnecting the beams of each pair in rear of said rear tractor wheels, means interconnecting said pairs of beams, a pair of brackets supported by the tractor between said rear wheels, lifting rock shaft means supported by said brackets, means connecting said rock shaft means with said beams whereby operation of said shaft means raises and lowers said beams, and means for operating said shaft means.

33. The combination with a tractor including front and rear wheels and rear drive housings in which said rear wheels are mounted, of an implement attachment comprising a plurality of beams, earth-working devices on said beams disposed adjacent the position of said rear wheels, hitch means connecting the front portions of said beams with said tractor forward of the position of said rear wheels, rearwardly extending brackets connected with said drive housings, lifting rock shaft means supported by said brackets, said beams being arranged in pairs at opposite sides of the rear wheels of the tractor, means interconnecting the beams of each pair at their rear ends, means loosely connecting the pairs of beams together, link means connecting the beams with said lifting rock shaft means whereby the beams may be raised and lowered, and means for operating said rock shaft means.

34. The combination with a tractor including front and rear wheels and drive housings for the latter, of an implement attachment comprising a plurality of pairs of beams, the beams of each pair being disposed on opposite sides of said rear wheels, earth-working tools on said beams, hitch means connecting the front portions of said beams with the tractor forward of the position of the rear wheels thereof, rearwardly extending brackets attached to said drive housings between said rear wheels, lifting rock shaft means carried by said brackets and extending laterally beyond the rear wheels at each side of the tractor, means connecting the rock shaft means with said beams to raise the same, and means for operating said rock shaft means.

35. The combination with a tractor including front and rear wheels and drive housings for the latter, of an implement attachment comprising a plurality of generally longitudinally extending tool beams disposed intermediate said rear traction wheels and on the outer sides thereof, earth-working tools on said beams, hitch means connecting the front portions of said beams with said tractor, brackets carried by said drive housings between said rear wheels, lifting rock shaft means journaled on said brackets and extending laterally beyond said rear wheels, means connecting said rock shaft means with said beams both laterally inside and outside said rear wheels, and means for operating said shaft means.

36. The combination with a tractor including front and rear wheels, of an implement attachment comprising a plurality of beams extending substantially longitudinally of the tractor, a transverse draft bar detachably connected with the tractor intermediate the front and rear wheels of the tractor, the forward portions of said beams being movably connected with said draft bar, earth-working devices on said beams disposed adjacent to the position of said rear tractor wheels, gauge wheels connected to support the rear portions of said beams, and means connecting the rear portions of the beams together transversely of the tractor.

37. The combination with a tractor including front and rear wheels, of an implement attachment comprising a plurality of beams extending substantially longitudinally of the tractor and forwardly of the rear wheels thereof and disposed on both sides of said rear wheels, earth-working devices on said beams, and yieldable hitch means connecting said beams with the tractor.

38. The combination with a tractor including front and rear wheels, of an implement attachment comprising a plurality of tool beams arranged in pairs at opposite sides of the tractor, the beams comprising each pair being disposed on opposite sides of and extending rearwardly of the rear wheels of the tractor, earth-working tools connected with the rear ends of said beams, hitch means connecting the front portions of said beams with said tractor forward of the position of said rear wheels, means connecting the beams of each pair together, and a link pivotally connecting said pairs of beams.

39. The combination with a tractor including front and rear wheels, of an implement attachment comprising a plurality of tool beams arranged in pairs at opposite sides of the tractor, the beams comprising each pair being disposed on opposite sides of the rear wheels of the tractor, earth-working tools on said beams disposed rearwardly of said rear wheels, hitch means connecting the front portions of said beams with said tractor forward of the position of said rear wheels, means connecting the beams of each pair together in laterally spaced relation, and means connecting the inner beams of each pair to maintain said pairs in laterally spaced relation.

40. The combination with a tractor including front and rear wheels, of an implement attachment comprising a plurality of tool beams arranged in pairs at opposite sides of the tractor, the beams comprising each pair being disposed on opposite sides of the rear wheels of the tractor, earth-working tools on said beams, hitch means connecting the front portions of said beams with said tractor forward of the position of said rear wheels, means connecting the beams of each pair together, means connecting said pairs of beams in laterally spaced relation, and a gauge wheel for each beam.

41. The combination with a tractor including front and rear wheels, of an implement attachment comprising a plurality of tool beams arranged in pairs at opposite sides of the tractor, the beams comprising each pair being disposed on opposite sides of the rear wheels of the tractor, earth-working tools on said beams, hitch means connecting the front portions of said beams with said tractor forward of the position of said rear wheels, rock shaft means supported on the tractor and flexibly connected with the beams for lifting them to transport position and providing for free rising and falling movements of said beams when the latter are in their operating position, means connecting the beams of each pair together, means connecting said pairs of beams, and ground engaging gauge means for said beams.

42. The combination with a tractor including front and rear wheels, of an implement attachment comprising a plurality of beams extending substantially longitudinally of the tractor and vertically movable independently of each other, there being at least one beam on each side of the central plane of the tractor, earth-working devices on said beams disposed adjacent to the position of said rear tractor wheels, means connecting the front portions of said beams with said tractor forward of the position of said rear wheels, gauge wheels connected with the rear portions of said beams, two of said gauge wheels being spaced laterally inwardly from the associated beams and disposed adjacent the central plane of the tractor, and means for maintaining the beams in fixed lateral relationship.

43. The combination with a tractor including front and rear wheels, of an implement attachment comprising a plurality of beams, means pivotally connecting the front portions of said beams with said tractor at hitch points disposed forwardly of said rear tractor wheels, earth-working devices on the rear portions of said beams, two crank axles pivotally connected with the rear portions of said beams at laterally spaced points thereon and each having a laterally inwardly directed crank portion, and gauge wheels mounted on said inwardly directed crank portions and disposed to run on the ground transversed by the central portion of the tractor.

CHARLES H. WHITE.
ELMER McCORMICK.